United States Patent [19]

Jadamus et al.

[11] Patent Number: 4,921,762

[45] Date of Patent: May 1, 1990

[54] PROCESS FOR PRODUCING A CHEMICAL BOND BETWEEN MOLDING MATERIALS BASED ON POLYPHENYLENE ETHERS ON THE ONE HAND AND PEROXIDE VULCANIZED EP(D)M RUBBERS ON THE OTHER HAND

[75] Inventors: Hans Jadamus, Marl; Thomas Grosse-Puppendahl, Haltern; Klaus-Peter Richter, Marl, all of Fed. Rep. of Germany

[73] Assignee: Huels Aktiengesellschaft, Marl, Fed. Rep. of Germany

[21] Appl. No.: 240,191

[22] Filed: Sep. 6, 1988

[30] Foreign Application Priority Data

Nov. 7, 1987 [DE] Fed. Rep. of Germany ....... 3737891

[51] Int. Cl.$^5$ .............................................. B32B 27/32
[52] U.S. Cl. ................................ 428/521; 156/307.1; 156/307.7; 428/523
[58] Field of Search .......................... 156/307.7, 307.1; 428/521, 523

[56] References Cited

U.S. PATENT DOCUMENTS 4,410,595 10/1983 Matsumoto et al. ................ 428/413

*Primary Examiner*—John J. Gallagher
*Attorney, Agent, or Firm*—Oblon, Spivak, McClelland, Maier & Neustadt

[57] ABSTRACT

A process for bonding a thermoplastic PPE-containing polymer and a rubber by covulcanization, comprising the steps of:

heating and covulcanizing said PPE-containing polymer and said rubber, wherein said rubber comprises:
(a) 100 parts by weight of a mixture comprising 100-20 wt. % of an EP(D)M rubber and 0-80 wt. % of a styrene-butadiene rubber obtained by emulsion polymerization,
(b) 100-300 parts by weight of loading material,
(c) 1-10 parts by weight of a peroxidic vulcanization agent, and
(d) 0.5-4 parts by weight of a vulcanization activator, wherein a vulcanization bond is formed between said PPE-containing thermoplastic polymer and said rubber.

12 Claims, No Drawings

PROCESS FOR PRODUCING A CHEMICAL BOND BETWEEN MOLDING MATERIALS BASED ON POLYPHENYLENE ETHERS ON THE ONE HAND AND PEROXIDE VULCANIZED EP(D)M RUBBERS ON THE OTHER HAND

BACKGROUND OF THE INVENTION

1. Field of the Invention:

The invention relates to a process for permanently bonding thermoplastic molding materials based on polyphenylene ethers and peroxide vulcanized EP(D)M rubbers, as well as the objects obtained by this process.

2. Discussion of the Background:

Frequently a single material cannot contribute all of the properties that are demanded of an object. Such incompatible combinations of properties are e.g. simultaneously high stability and rubber elasticity or high hardness and rigidity on the one hand and skid resistance on the other hand.

In order to provide components with properties which one single material cannot contribute, they are composed of components of different materials. Frequently, a permanent adhesion between the components of different materials is an essential pre-requisite for the functionability of such objects.

The best process for producing such bonding materials is to covulcanize the rigid molding material and the rubber material.

Thus it is known that SBR and EPR rubbers and polybutadienes have an unexpectedly high adhesion to specific plastics following longer thermal treatment. These plastics, which are characterized by the recurrent structural unit,

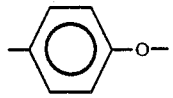

comprise poly(2,6-dimethyl-1,4-phenylene) ethers, polysulfones, and polycarbonates. With polystyrenes, which do not have this structural unit, the strength of adhesion is more than 6-times smaller (P. Dreyfuss, M. L. Runge, J. Appl. Pol. Sci. 23, pp. 1863 to 1866). The authors assert that in many cases these methods yield an excellent bond between the elastomer and plastic layer, even if or precisely when the elastomers, as in the case of EPR rubber, do not contain double bonds.

In fact, there are a number of disadvantages associated with this method. The pure polyphenylene ethers play an economically subordinate role due to their poor processability and their inadequate notch impact resistance. All PPE-containing polymer mixtures contain additional polymers whose bonding properties are definitely worse. For the economically interesting polymer mixtures whose proportion of styrene is more than 10%, the method described above should, therefore, be unsuitable.

For industrial application purposes, filler-containing rubbers are generally used. The adhesion properties of the filler-containing rubbers should be worse in comparison with the studied filler-free systems.

Furthermore, a significant disadvantage is the condition that the treatment times are quite long. Multiple hours of exposure time are incompatible with modern economical production of molded articles.

Under these conditions, it is not surprising that this process has not been further developed nor has it been implemented for industrial use. If despite these objections, the process is closely scrutinized, it is clear that the authors' primary objective was to produce a physical bond between specific thermoplastics and synthetic rubbers. In particular, a cold flow was to be prevented. A chemical bond was to be avoided; nevertheless, it was found that the strength of adhesion decreases with the increased degree of cross-linking of rubber (see A. Ahagon, A. N. Gent, J. Polym. Sci.; Polym. Phys. Ed. 13, p. 1285 (1975) Summary).

If one pursues the investigations, it is clear that the adhesion values are in no way as good as shown in the article cited (see comparison tests in Table 2 of DE-OS 36 02 705). In individual cases the strength of separation is immeasurable, since the rubber has become crumbly in the course of thermal treatment.

Recently a very interesting process has been developed for producing a chemical bond between molding materials based on polyphenylene ethers (PPE) and rubbers containing specific double bonds and vulcanizable with sulfur (see DE-OS 36 02 705). In this process SBR, BR, IR, and IIR rubbers and their grafts are added. Finally it is also possible to use rubber mixtures, which can also contain CIIR, CR, and NBR rubbers in specific ratios.

The adhesions values that are sought are noticeable; however, the stability of the added rubber materials with respect to solvents leaves as much to be desired as their stability with respect to weathering.

In principle, with this process one could conceive of adding other double bond-containing rubbers, which in the conventional manner are more suitable to meeting these requirements. However, it has been demonstrated that for example EPDM rubbers have inadequate adhesion values under those process conditions that have been recognized as important. Therefore, with known processes, it is not possible to produce a bond between polyphenylene ethers and rubbers hand that combine the adequate adhesion properties with good stability with respect to solvents and weathering.

SUMMARY OF THE INVENTION

Accordingly, one object of the present invention is to provide a process for bonding a thermoplastic polyphenylene ether-containing polymer and a rubber by vulcanization so that a bond is formed between the PPE-containing polymer and the rubber.

Another object of the invention is to provide a vulcanized product having excellent adhesion strength, separation strength as well as resistance to solvents and good stability.

These and other objects which will become apparent from the following specification have been achieved by the present process for bonding a thermoplastic PPE-containing polymer and a rubber by vulcanization, comprising the steps of heating the PPE-containing polymer and vulcanizing the rubber, wherein the PPE-containing polymer comprises:

(i) 100 parts by weight PPE,
(ii) 0–20 parts by weight of a polyalkenylene, and
(iii) 0–100 parts by weight of a styrene polymer, and
wherein the rubber comprises:
(a) 100 parts by weight of a mixture comprising 0–80 wt.% of a EP(D)M rubber and 0–80 wt.% of a styrene-butadiene rubber obtained by emulsion polymerization,
(b) 100–300 parts by weight of loading materials, (c) 1-10 parts by weight of a peroxidic vulcanization agent, and (d) 0.5-4 parts by weight of a vulcanization activator, wherein a vulcanization bond is produced between the PPE-containing thermoplastic polymer and the rubber.

DETAILED DESCRIPTION OF THE PREFERRED EMBODIMENTS

The process of the invention is characterized by the following advantages:

1. Not only polyphenylene ethers but also in general polystyrenes and hydrocarbons containing PPE molding materials may be used.
2. Preferably the bond is produced in only a few minutes.
3. The rubber added to the bonding system can also be added to the exterior region of the article.

The compositions of the present PPE-containing molding material contain the following components: (a) PPE, (b) polyalkenylenes, (c) styrene polymers, and (d) additives.

The PPE-containing molding material may be comprised entirely of PPE or may contain up to 20 parts by weight of a polyalkenylene, up to 100 parts by weight of a styrene polymer and, optionally, other known additives. Preferably, the PPE-containing molding material contains 5-15 parts by weight of a polyalkylene, in particular a polyoctenylene.

Polyphenylene ethers (a) may be polymers based on substituted phenols having the general structure:

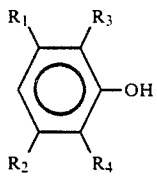

in which $R_1$ and $R_2$, independently of one another stand for a methyl group or preferably hydrogen. Also, $R_2$ may be hydrogen and $R_4$ a tertiary alkyl group having up to 6 carbon atoms, as for example the tertiary butyl group, or independently of one another $R_3$ and $R_4$ respectively stand for an n-alkyl group having up to 6 carbon atoms. Preferably 2,6-dimethylphenol is used. Of course, mixtures of the monomeric phenols listed here may be added. In particular, poly(2,6-dimethyl-1,4-phenylene ethers) having an intrinsic viscosity ranging from 0.4 to 0.7 ml/g (measured in chloroform at 25° C.) are preferred.

The polyphenylene ethers can be produced from 2,6dimethylphenol, for example, in the presence of complex forming agents, such as copper bromide and morpholine (see DE-OS 32 24 692 and OS32 24 691). Generally they are added as a powder or a granular material.

The polyalkenylenes (b) are produced by ring opening or ring expansion polymerization of cycloalkenes (see K.J. Ivin, T. Sagusa "Ring-opening Polymerization," Vol. 1, *Elsevier Appl. Sci.* Publishers, London, in particular pages 121 to 183 (1984). Preferred polyalkenylenes are derived from $C_{5-12}$ cycloalkenes, with polypentenes polydodecenylenes and polyoctenylenes being particularly preferred.

Polyoctenylenes (see A. Draxler, Kautschuk and Gummi, Kunststoff 1981, pages 185 to 190) are preferred. Polyoctenylenes having varying cis and trans double bond ratios, varying J-values, and correspondingly varying molecular weights are obtainable according to methods known from the literature. Polyoctenylenes having a viscosity number (J value) ranging from 50 to 350 ml/g, preferably from 80 to 160 ml/g. measured in a 0.1% solution in toluene, are preferred. Fifty-five to 95%, preferably 75 to 85%, of the double bonds are in the trans-form.

Molding materials based on polyphenylene ethers and polyoctenylenes are described in DE-OS 34 36 780 and 34 42 273.

Known styrene homopolymers and/or impact resistant styrene polymers can be added as components (c). See DE-OS 36 02 705 for specific data on suitable styrene polymers.

If desired, the PPE molding material may contain other derivatives (d) such as stabilizers, processing agents, foaming agents, metal fibers, rubber black, graphite, metal spangles, titanium dioxide and zinc sulfide. The ratio of reinforcing agents in the PPE material can range up to 50%, that of the flame retardant up to 15% and all other additives to a total of 5%, with respect to the total molding material.

In particular, aromatic phosphorus compounds, such as triphenylphosphine oxide and triphenyl phosphate, are suitable as flame retardants. For details refer to DE-OS 36 02 705.

Suitable stabilizers are organic phosphites, such as e.g. didecylphenyl phosphite and trilauryl phosphite, sterically hindered phenols and tetramethylpiperidine, benzophenone and triazole derivatives.

Preferably the PPE molding materials are produced by mixing the components in the melted state. At least one component is completely melted and the melt thus obtained is mixed with the other components. Another possibility is to melt and mix all of the components together. Preferably melting temperatures ranging from 250° to 350° C., in particular from 260° to 300° C., and curing periods ranging from 0.3 to 10 minutes, in particular from 0.5 to 3 minutes, are used. Conventional equipment for processing highly viscous melts, not only in batch runs but also in continuous operations, are suitable for melting and mixing. Twin-screw kneaders and co-kneaders are especially suitable.

Instead of compounding, however, it is also possible to produce the PPE molding materials by another method, e.g. by precipitating the components out of a solution mixture. As a common solvent, toluene is suitable; as a precipitating agent, methanol may be used, for example. The polymer mixture can also be obtained by evaporating the solvent, e.g. in accordance with DE-OS 33 37 629.

The rubber composition, added in the process of the present invention, contains the following components:

(a) 100 parts by weight of a mixture comprising 20 to 100 wt.% of a EP(D)M rubber and 80 to 0% of styrene-butadiene rubber obtained by emulsion polymerization, (b) 100 to 300 parts by weight of loading materials, (c) 1 to 10 parts by weight of peroxidic vulcanization agents, (d) 0.5 to 4 parts by weight of vulcanization activators and if desired, softening agents.

The EPM rubber is produced in the conventional manner by polymerization of a mixture comprising 25-75% ethylene and 75-25% propylene in the presence of a Ziegler-Natta catalyst, such as, e.g. diethyl aluminum chloride.

The EPDM rubber is produced, analogously, by polymerization of a mixture comprising more than 25% ethylene, more than 25% propylene and 1-10%, in particular 1 to 3%, of a diene. This diene should not be conjugated. Bicyclo(2.2.1)heptadiene, 1,4-hexadiene, dicyclopentadiene, and especially 5-ethylidene-norbornene are preferred. Suitable EP(D)M rubbers are produced under the tradename BUNA ® AP by Bunawerke Huls GmbH, D-4370 Marl.

The aforementioned types of rubbers are produced according to methods known from the literature (see W. Hofmann, Kautschuktechnologie, Genter Verlag, Stuttgart, 1980).

Normally the styrene-butadiene rubbers contain 18 to 40 percent by weight styrene. Oil stretched types are also suitable. The rubber can be a bale type if desired. However, for processing it is more advantageous to start with a powdery, filler-containing rubber. As is well-known, E-SBR rubber is produced in emulsion by polymerization of 15 to 40 percent by weight styrene and correspondingly 85 to 60% butadiene. Such a rubber for example is described in the plant journal BUNA ® EM No. 601 of Bunawerke Huls GmbH, September 1982 issue. Its Mooney viscosity ML (1+4), 100° C., ranges from 30 to 120 (see Mooney, Rubber Chem. Techn. 30, p. 460 (1957).

A powdery, filler-containing E-SBR rubber is especially preferred. There are a number of different methods for producing powdery, filler-containing rubbers. However, many processes are so time-consuming and complicated that they have no practical meaning. Recently a suitable industrial scale process was described for the first time (see DE-OS 28 22 148). This process is characterized by mixing the rubber components in dissolved form with an aqueous filler suspension, which contains a water soluble aluminum salt and water glass.

It is important that the aqueous filler dispersions not only have a pH value ranging from 3.0 to 3.7 but also that when this dispersion is mixed with the rubber components, enough mineral acid is added so that this pH range is also maintained in the mixture thus obtained.

All of the commercially available powdery, inorganic fillers used for EP(D)M and E-SB rubbers such as rubber black, silicic acid, silicates, and calcium carbonate as well as zinc oxide and stearic acid are suitable as loading materials.

Suitable softening agents are processing oils, in particular naphthenic oils, in a preferred quantity of up to 150 parts by weight, with respect to 100 parts by weight rubber.

Suitable peroxidic vulcanization agents are those peroxides known in the art for cross-linking of EP(D)M rubbers, such as e.g. 2,5-dimethyl-2,5-bis(tert-butylperoxy)hexane, dicumyl peroxide, 4,4-di-tert-butylperoxy-n-butylvalerate, 1,1-di-tert-butylperoxy3,3,5-trimethylcyclohexane and in particular bis(tert-butylperoxyisopropyl)benzene. The use of these peroxidic vulcanization agents in preparing EP(D)M rubbers is described in the company brochure "Rubbery Chemicals-Crosslinking Peroxides" of *Akzo Chemie* (publication date: April 1985).

With regard to vulcanization activators, triallyl cyanurate (TAC), acrylates such as 1,4-butanediol-dimethacrylate (BDMA) and trimethylolpropane trimethacrylate (TRIM) are suitable, for example. TAC and/or BDMA are preferred.

The Process of Covulcanization

Molded articles composed of rigid and rubber elastic molding materials can be produced in one or two steps.

In the two-step process, a molded article of PPE material, which is produced by press curing, injection molding or extrusion, is loaded with the pre-molded rubber material, if desired, and subjected to the vulcanization conditions of rubber. The rigid molded article can be loaded with rubber by press-curing, injection molding or extruding. The choice of rubber with respect to viscosity of the material will depend on the selected shaping process.

In the two-step injection molding process the process is similar to that of the two-step production of two color injection molded parts. As the insert, a molded article of PPE material is used. Barrel and screw of the injection molding machine are designed in the conventional manner for rubber processing and the mold can be heated to vulcanization temperature.

The optimal vulcanization conditions depend on the selected rubber mixture, in particular its vulcanization system, and the shape of the molded article. For particular data refer to W. Hofmann, loc. cit., page 255 ff. This reference also gives the preferably used mixtures of diene rubbers with stearic acid, zinc oxide, fillers, processing oils, and vulcanization activators.

Suitable bulk temperatures of the rubber mixtures in the cylinder range from 40° to 80° C., preferably from 60° to 75° C.

Suitable mold temperatures range from 140° to 200° C.; preferably from 150° to 180° C. In using PPE materials which contain high percentages of styrene resins or fire protection agents which lower the dimensional stability in heat, temperatures are selected at the lower end of the aforementioned range.

The vulcanization periods range from 30 seconds to 15 minutes, preferably from 5 to 10 minutes.

In loading and complete curing according to the two-step extrusion process, a profile, produced in the first step, of a PPE material, for example a pipe, is sheathed with the rubber material and, if desired, completely vulcanized under pressure. The same process is repeated with sheets, mats, webs, ropes, etc. of PPE materials.

The one-step injection molding process is analogous to that of the one-step two color injection molding process. In this case there is an injection molding machine equipped for processing thermoplastics; the other, for the rubber processing. The mold is heated to the predetermined vulcanization temperature, which should be below the solidification temperature of the PPE material.

The following objects, for example, can be produced from the vulcanizable materials:

Brake and coupling pulleys, rubber coated rollers; flanges, pipe and hose couplings, fittings; housing for pumps and electrically driven tools, casings for lamps; sleeves, gaskets; impact and radiation absorbing components; spring elements; PPE reinforced rubber profiles; conveyor belts; drive belts, vehicle wheels; pressure rollers for video and audio band equipment; and caterpillar track linkages.

Other features of the invention will become apparent in the course of the following descriptions of exemplary embodiments which are given for illustration of the invention and are not intended to be limiting thereof.

EXAMPLES

Example 1

PPE molding materials 1.1 Poly(2,6-dimethyl-1,4-phenylene ether) having a J-value of 68 ml/g.

Polyphenylene ether is obtained by oxidative coupling of 2,6-dimethylphenol, quenching the reaction and subsequent reaction extraction according to DE-OS 33 13 864 and OS 33 23 777. The solvent is removed by evaporation and the melt is extruded via a vented extruder and subsequently granulated.

1.2 A polymer mixture, consisting of 90 parts by weight poly(2,6-dimethyl-1,4-phenylene ether) and 10 parts by weight polyoctenylene.

A polyoctenylene having a J-value of 120 ml/g and a trans-content of 80% is added to the PPE prepared is described above. Such a product is commercially obtained under the tradename VESTENAMER® 8012 (producer: HULS AKTIENGESELLSCHAFT, D-4370 Marl 1). Other characteristics of this product can be obtained from the journal "Kautschuk, Gummi, Kunststoffe" 1981, pages 190 to 195, and from Huls Merkblatt No. 2247 "*VESTENAMER* 8012." The polyoctenylene can, for example, also be produced according to K. J. Ivin "Olefin Metathesis," *Academic Press*, page 236 ff. (1983), and the other references cited therein.

A polyphenylene ether having a J-value of 45 ml/g is produced analogously to Example 1.1 and combined in toluene with the polyoctenylene. The PPE material is obtained as described in Example 1.1.

1.3 A polymer mixture, consisting of 78 parts by weight poly(2,6-dimethyl-1,4-phenylene ether) and 22 parts by weight impact-resistant, modified polystyrene.

VESTYRON® of Huls Aktiengesellschaft, D-4370 Marl, is added as an impact-resistant styrene polymer. The characteristics of this product can be obtained from the brochure "Kunststoffe from Huls, VESTYRON," September 1979 issue.

Polyphenylene ether having a J-value of 50 ml/g is obtained by oxidative coupling of 2,6-dimethylphenol, quenching the reaction and subsequent extraction according to DE-OS 33 13 864 and OS 33 32 377. According to the German patent application No. P 33 27 629, from this polyphenylene ether and the rubber-modified polystyrene, a mixture is produced in a weight ratio of 78:22.

1.4 A polymer mixture, consisting of 60 parts by weight poly(2,6-dimethyl-1,4-phenylene ether), 30 parts by weight impact-resistant, modified polystyrene, and 10 parts by weight polyoctenylene.

VESTYRON® 616 is used as impact-resistant modified polystyrene; and VESTENAMER® is used as polyoctenylene and processed as in example 1.3.

1.5 A polymer mixture consisting of 60 parts by weight poly(2,6-dimethyl-1,4-phenylene ether), 30 parts by weight styrene homopolymer and 10 parts by weight polyoctenylene.

VESTYRON® 114, a product of Huls Aktiengesellschaft, D-4370 Marl, is added as a styrene homopolymer. The characteristics of this product can be obtained from the brochure "Kunststoffe von huls, VESTYRON, September 1983 issue. Otherwise the process is analogous to that in example 1.4.

1.6 A polymer mixture, consisting of 52 parts by weight poly(2,6-dimethyl-1,4-phenylene ether) and 48 parts by weight impact-resistant, modified polystyrene. The process is analogous to that in example 1.3.

Example 2

Rubbers 2.1 BUNA® AP 437
2.2 BUNA® AP 341
2.3 BUNA® AP 301

BUNA® is a product of Bunawerke Huls GmbH in D4370 Marl. The properties of this product can be obtained from the product information "BUNA AP," December 1980.

2.4 BUNA® EM 1500

BUNA EM 1500 is a styrene-butadiene rubber obtained by emulsion polymerization and produced by Bunawerke Huls GmbH in D-4370 Marl. The properties of this product can be obtained from the company brochure "BUNA EM," 4th edition (September 1982).

In order to demonstrate bonding action, samples were produced by producing a plastic board of the thermoplastic PPE-containing polymer in accordance with DIN 53 531 Tl, covering about a third of this board with a teflon film, applying a compatible rubber sheet on the board, producing the bond according to the press-curing process, and then cutting out a sample having a 25 mm width.

Table 1 shows the composition of the rubbers. Table 2 lists the test results. The experimental data of Table 2 relate exclusively to the PPE material under Example 1.2. High adhesion and good stability with respect to solvents are also possible with the other PPE materials.

Obviously, numerous modifications and variations of the invention are possible in light of the above teachings. It is therefore to be understood that within the scope of the appended claims, the invention may be practiced otherwise than as specifically described herein.

TABLE 1

Components of Rubber Compositions 3.1 to 3.9
(Data in Parts by Weight)

| Example | 3.1 | 3.2 | 3.3 | 3.4 | 3.5 | 3.6 | 3.7 | 3.8 | 3.9 |
|---|---|---|---|---|---|---|---|---|---|
| Rubber 2.1 | 100 | — | — | — | — | — | — | — | — |
| Rubber 2.2 | — | 100 | 100 | 100 | — | 70 | 30 | 100 | 100 |
| Rubber 2.3 | — | — | — | — | 100 | — | — | — | — |
| Rubber 2.4 | — | — | — | — | — | 30 | 70 | — | — |
| zinc oxide[1] | 5 | 5 | 5 | 5 | 5 | 5 | 5 | 5 | 5 |
| aluminum silicate[2] | 140 | 140 | 140 | 140 | 140 | 140 | 140 | 140 | 50 |
| Juraperle 10 H[3] | 60 | 60 | 60 | 60 | 60 | 60 | 60 | 60 | — |
| oil[4] | 50 | 50 | 50 | 50 | 50 | 50 | 50 | 50 | 30 |
| Ultrasil® VN 2[5] | — | — | — | — | — | — | — | — | 40 |
| Silane A 172[6] | 1.5 | 1.5 | 1.5 | — | 1.5 | 1.5 | 1.5 | 1.5 | 1.5 |
| Vulcanox® HS[7] | 1.5 | 1.5 | 1.5 | 1.5 | 1.5 | 1.5 | 1.5 | 1.5 | 1.5 |

TABLE 1-continued

Components of Rubber Compositions 3.1 to 3.9
(Data in Parts by Weight)

| Example | 3.1 | 3.2 | 3.3 | 3.4 | 3.5 | 3.6 | 3.7 | 3.8 | 3.9 |
|---|---|---|---|---|---|---|---|---|---|
| Durex ® 0[8] | — | — | — | — | — | — | — | 3.0 | — |
| TAC[9] | 1.0 | 1.0 | 1.0 | 1.0 | 1.0 | 1.0 | 1.0 | 1.0 | 1.0 |
| Perkadox 14/40[10] | 7.5 | 7.5 | 7.5 | 7.5 | 7.5 | 7.5 | 7.5 | 7.5 | 7.5 |

Notes for Table 1
[1] The degree of purity of the added zinc oxide is higher than 99%. The particle size ranges from 0.8 to 1.0 mm.
[2] A combination of China clay, Polestar ® 200 R of ECC International, St. Austell, Cornwall, Great Britian, is added as aluminum silicate. The properties of the product can be obtained from the company brochure.
[3] Juraperle 10 H is a filler of Wingertsberg Fullstoff- and Kreidewerk GmbH, Cologne-Bayental.
[4] Sunpar 150, a product of Sunoil Co. Belgium Lv, Antwerp, is used as paraffinic oil.
[5] ULTRASIL ® VN2, a highly active silica was added. This product is available from Fullstoff-Gesellschaft, Marquart-Wesseling GmbH, D-5047 Wesseling.
[6] Silane A 172 is a tradename for vinyl-tris-(2-methoxyethoxy)silane.
[7] VULCANOX ® HS, an anti-aging composition from Bayer AG, Leverkusen, was added. It contains a 2,2,4-trimethyl-1,2-dihydroquinoline.
[8] DUREX ® 0, a semi-reinforcing gas black from Degussa, Hanau, was added.
[9] TAC (triallylcyanurate) is a product from Degussa, Hanau.
[10] Perkadox 14/40 is product from Akzo-Chemie.

TABLE 2

Properties of the bonding materials of the invention (The vulcanization temperature was 180° C. the vulcanization time was 15 minutes)

| Rubber | PPE material | strength of adhesion in N | strength of separation in N/mm | type of separation |
|---|---|---|---|---|
| 3.1 | 1.2 | 268 | 10.7 | cohesive |
| 3.2 | 1.2 | 295 | 11.8 | cohesive |
| 3.3 | 1.2 | 315 | 12.6 | cohesive |
| 3.4 | 1.2 | 465 | 18.6 | cohesive |
| 3.5 | 1.2 | 313 | 12.5 | cohesive |
| 3.6 | 1.2 | 315 | 12.6 | cohesive |
| 3.7 | 1.2 | 243 | 9.7 | cohesive |
| 3.8 | 1.2 | 265 | 10.6 | cohesive |
| 3.9 | 1.2 | 280 | 11.2 | cohesive |

What is claimed as new and desired to be secured by letters patent of the United States is:

1. A process for bonding a thermoplastic PPE-containing polymer and a rubber by vulcanization, comprising the steps of:
   heating said PPE-containing polymer and vulcanizing said rubber in contact with said thermoplastic polymer, wherein said rubber comprises:
   (a) 100 parts by weight of a mixture comprising 100-20 wt.% of an EP(D)M rubber and 0-80 wt.% of a styrene-butadiene rubber obtained by emulsion polymerization,
   (b) 100-300 parts by weight of loading material,
   (c) 1-10 parts be weight of a peroxidic vulcanization agent, and
   (d) 0.5-4 parts by weight of a vulcanization activator, wherein a vulcanization bond is formed between said PPE-containing thermoplastic polymer and said rubber.

2. The process of claim 1, wherein said PPE-containing polymer comprises:
   (i) 100 parts by weight PPE,
   (ii) 0-20 parts by weight of a polyalkenylene, and
   (iii) 0-100 parts be weight of a styrene polymer.

3. The process of claim 1, wherein said rubber is selected from the group consisting of EPM rubber, EPDM rubber and mixtures thereof.

4. The process of claim 1, wherein said PPE-containing polymer comprises 5-15 parts by weight of said polyalkenylene.

5. The process of claim 4, wherein said polyalkenylene is a polypentenylene, polyoctenylene or polydodecenylene.

6. The process of claim 1, wherein said loading material comprises zinc oxide, calcium carbonate, aluminum silicate or mixtures thereof.

7. The process of claim 1, wherein said rubber composition further comprises up to 150 parts by weight of a processing oil.

8. The process of claim 7, wherein said processing oil is a naphthenic oil.

9. The process of claim 1, wherein said heating and vulcanizing are conducted at a temperature in the range from 140-200° C. for a period of time ranging from 30 seconds to 15 minutes.

10. The process of claim 9, wherein said temperature ranges from 150-180° C. and said period of time ranges from 5-10 minutes.

11. The process of claim 1, wherein said PPE is poly(2,6-dimethyl-1,4-phenylene ether).

12. The product obtained by the process of claim 1.

* * * * *